(12) United States Patent
Blackburn et al.

(10) Patent No.: US 7,950,843 B2
(45) Date of Patent: May 31, 2011

(54) MIXING MACHINE AND ASSOCIATED BOWL SUPPORT ARRANGEMENT

(75) Inventors: Neal H. Blackburn, Springfield, OH (US); Ellis G. Short, Troy, OH (US); Janice Jones Schnipke, Springfield, OH (US); Joseph C. Huang, Dayton, OH (US)

(73) Assignee: Premark FEG L.L.C., Wilmington, DE (US)

( * ) Notice: Subject to any disclaimer, the term of this patent is extended or adjusted under 35 U.S.C. 154(b) by 738 days.

(21) Appl. No.: 12/018,438

(22) Filed: Jan. 23, 2008

(65) Prior Publication Data
US 2009/0185443 A1 Jul. 23, 2009

(51) Int. Cl.
*A21C 1/14* (2006.01)
(52) U.S. Cl. ........................ 366/207; 220/660
(58) Field of Classification Search ............. 366/96–98, 366/197–199, 203, 288, 206–207, 331; 99/348; 403/381, 348, 353; 215/379, 386; 220/735–736, 220/660
See application file for complete search history.

(56) References Cited

U.S. PATENT DOCUMENTS

| | | | |
|---|---|---|---|
| 32,482 A | 6/1861 | Lane | |
| 140,527 A | 7/1873 | Munson, Jr. | |
| 227,239 A | 5/1880 | Frentress | |
| 320,255 A | 6/1885 | Jackman | |
| 613,888 A | 11/1898 | Schmuck | |
| 735,353 A | 8/1903 | Eifert | |
| 760,693 A | 5/1904 | Lancaster et al. | |
| 826,223 A | 7/1906 | Broadwell | |
| 879,590 A | 2/1908 | Roth | |
| 910,648 A | 1/1909 | Davison | |
| 1,143,484 A | 6/1915 | Beach | |
| 1,264,128 A | 4/1918 | Rataiczak | |
| 1,366,114 A | 1/1921 | Boggs | |
| 1,415,735 A | 5/1922 | Trust et al. | |
| 1,428,704 A | 9/1922 | Petri | |
| 1,468,615 A | 9/1923 | Gettenstein et al. | |

(Continued)

FOREIGN PATENT DOCUMENTS
DE 1070563 12/1959
(Continued)

OTHER PUBLICATIONS

PCT, International Search Report and Written Opinion, International Application No. PCT/US2009/030705 (Jul. 21, 2009).

(Continued)

*Primary Examiner* — Charles E Cooley
(74) *Attorney, Agent, or Firm* — Thompson Hine LLP

(57) ABSTRACT

A mixing machine includes a head including a rotatable output member for receiving a mixer tool. A mixer body includes a bowl receiving assembly below the head. The bowl receiving assembly includes a pair of bowl support arms extending outwardly from the mixer body to respective ends located at opposite sides of a bowl receiving location. Each bowl support arm includes a mount protrusion extending upwardly therefrom. The mount protrusion include a notch located at bases of the mount protrusions. The bowl receiving assembly is mounted for movement between a lowered position away from the head and a raised position toward the head. The bowl includes a keyway extending through a mount support, the keyway having an enlarged portion that receives the mount protrusion of one of the support arms and a necked-down portion that slides within the notch of the respective mount protrusion when the bowl is rotated.

15 Claims, 8 Drawing Sheets

U.S. PATENT DOCUMENTS

| | | | |
|---|---|---|---|
| 1,562,704 A | 1/1925 | Kevan | |
| 1,548,041 A | 8/1925 | Johnston et al. | |
| 1,548,919 A | 8/1925 | Ward | |
| 1,634,777 A | 7/1927 | Girdler | |
| 1,695,345 A | 12/1928 | Read | |
| 1,733,945 A | 10/1929 | Dehuff | |
| 1,743,271 A | 1/1930 | Gould | |
| 1,761,237 A | 6/1930 | Schiff | |
| 1,767,002 A | 6/1930 | Johnston et al. | |
| 1,774,509 A | 9/1930 | Gould | |
| 1,781,321 A | 11/1930 | Dehuff | |
| 1,807,589 A | 6/1931 | Edmunds | |
| 2,024,282 A | 12/1935 | Geiger | |
| 2,122,628 A | 7/1938 | Tracy | |
| 2,181,079 A | 11/1939 | Dehuff | |
| 2,251,903 A | 8/1941 | Anstice et al. | |
| 2,613,847 A | 10/1952 | Lacher | |
| 3,073,493 A | 1/1963 | Pfaffenberger | |
| 3,075,746 A | 1/1963 | Yablonski et al. | |
| 3,255,913 A | 6/1966 | Helm | |
| 3,533,603 A | 10/1970 | Kovacs | |
| 3,633,719 A | 1/1972 | Lynch | |
| 3,758,183 A | 9/1973 | Steinkamp et al. | |
| 4,042,221 A | 8/1977 | Myers et al. | |
| 4,135,828 A | 1/1979 | Cabak | |
| 4,173,925 A | 11/1979 | Leon | |
| 4,283,148 A | 8/1981 | Peterson | |
| 4,402,466 A | 9/1983 | Schmidt | |
| 4,528,718 A | 7/1985 | Brockhaus et al. | |
| 4,765,746 A | 8/1988 | Suay Puig | |
| 4,823,633 A | 4/1989 | Pike | |
| 4,854,711 A | 8/1989 | Hagan | |
| 4,937,916 A | 7/1990 | Redman | |
| 4,946,285 A | 8/1990 | Vennemeyer | |
| 5,048,709 A | 9/1991 | Alverson | |
| 5,123,747 A | 6/1992 | Derksen | |
| 5,157,983 A | 10/1992 | Sankovic | |
| 5,306,083 A | 4/1994 | Caldwell et al. | |
| 5,325,980 A | 7/1994 | Grimm et al. | |
| 5,325,982 A | 7/1994 | Cobb, Jr. | |
| 5,348,393 A | 9/1994 | Pappas, Jr. | |
| 5,385,422 A | 1/1995 | Kruger et al. | |
| 5,409,149 A | 4/1995 | Hough | |
| 5,472,276 A | 12/1995 | Ratermann et al. | |
| 5,494,350 A | 2/1996 | Childress | |
| 5,653,535 A | 8/1997 | Xie et al. | |
| 5,688,030 A * | 11/1997 | McAnally et al. | 312/223.2 |
| 5,690,427 A | 11/1997 | Jennings | |
| 5,806,704 A | 9/1998 | Jamison | |
| 5,860,738 A * | 1/1999 | Brinkman | 366/197 |
| 5,934,802 A | 8/1999 | Xie | |
| 6,092,647 A | 7/2000 | Yeh et al. | |
| 6,494,610 B1 | 12/2002 | Brunswick | |
| 6,595,680 B2 | 7/2003 | Sanpei et al. | |
| 6,883,959 B2 | 4/2005 | Donthnier et al. | |
| 6,942,437 B2 * | 9/2005 | Ripley et al. | 409/234 |
| 6,966,691 B2 * | 11/2005 | Brunswick et al. | 366/207 |
| 6,991,363 B2 | 1/2006 | Brunswick et al. | |
| 7,273,315 B2 * | 9/2007 | Huang et al. | 366/206 |
| 7,384,187 B2 | 6/2008 | Blackburn et al. | |
| 7,387,430 B2 | 6/2008 | Short et al. | |
| 7,438,463 B2 * | 10/2008 | Schnipke et al. | 366/203 |
| 7,543,980 B2 * | 6/2009 | Blackburn et al. | 366/206 |
| 7,690,835 B2 * | 4/2010 | Schnipke et al. | 366/207 |
| 2002/0093877 A1 | 7/2002 | Brunswick et al. | |
| 2002/0181322 A1 | 12/2002 | Brunswick et al. | |
| 2004/0120213 A1 | 6/2004 | Short et al. | |
| 2004/0120215 A1 | 6/2004 | Huang et al. | |
| 2004/0120216 A1 | 6/2004 | Donthnier et al. | |
| 2004/0208082 A1 | 10/2004 | Huang et al. | |
| 2005/0002272 A1 | 1/2005 | Brunswick et al. | |
| 2005/0141340 A1 | 6/2005 | Donthnier et al. | |
| 2010/0180431 A1 * | 7/2010 | Blackburn et al. | 29/700 |

FOREIGN PATENT DOCUMENTS

| | | |
|---|---|---|
| DE | 1298510 | 7/1969 |
| EP | 0637462 | 2/1995 |
| EP | 1027920 | 8/2000 |
| EP | 1114671 | 7/2001 |
| EP | 1151669 | 7/2001 |
| FR | 1079799 | 5/1954 |
| FR | 2728485 | 6/1996 |
| FR | 2740064 | 4/1997 |
| FR | 2805177 | 8/2004 |
| GB | 120393 | 3/1919 |
| GB | 672619 | 5/1952 |
| JP | 11-347390 | 12/1999 |
| TW | 477242 | 2/2002 |
| TW | 530691 | 5/2003 |
| WO | 96/30114 | 10/1996 |
| WO | 03/037494 | 5/2003 |
| WO | 2005/112722 | 12/2005 |

OTHER PUBLICATIONS

"Varimixer Food Mixer Model W 60," A Welbilt Company (2 pages) (Sep. 1996).
"100% Gear Transmission Mixer," American Eagle Food Machinery, Inc. (1 page) (date unknown).
"The Best Values Just Got Better," Univex (3 pages) (date unknown).
"Heavy Duty Dough Mixers," Spar Mixer (2 pages) (date unknown).
"EM20 Heavy Duty Professional 20 Quart Mixer," Dito Dean Food Prep (2 pages) (date unknown).
Service Manual, "Models H-600 and H-600-T and L-800 Mixers," Hobart Corporation (57 pages) (Sep. 1977).
Instructions Manual, "H600 and L800 Mixers," Hobart Corporation (23 pages) (Dec. 1999).
Instructions Manual . . . with Catalog of Replacement Parts—Hobart Models A-200 and A200T Mixers, The Hobart Manufacturing Company (16 pages) (Feb. 1996).
PCT, International Preliminary Report on Patentability, International Application No. PCT/US2009/030705 (Aug. 5, 2010).

* cited by examiner

MIXING MACHINE AND ASSOCIATED BOWL SUPPORT ARRANGEMENT

TECHNICAL FIELD

This application relates generally to mixing machines and, more particularly to a mixing machine and associated bowl support arrangement.

BACKGROUND

Mixers are used to mix and blend a variety of materials, such as food product. Typically, the materials are placed in a bowl and the bowl is located below a mixer head that includes a rotatable output member with a mixer tool. Various arrangements have been used to support the bowl beneath the mixer head. In some instances, the bowl is supported using a pair of bowl mount arms that extend about the bowl.

SUMMARY

In an aspect, a mixing machine includes a head including a rotatable output member for receiving a mixer tool. A mixer body includes a bowl receiving assembly below the head. The bowl receiving assembly includes a pair of bowl support arms extending outwardly from the mixer body to respective ends located at opposite sides of a bowl receiving location. Each bowl support arm includes a mount protrusion extending upwardly therefrom. The mount protrusions include a notch located at bases of the mount protrusions. The bowl receiving assembly is mounted for movement between a lowered position away from the head and a raised position toward the head.

In another aspect, a method of mounting a bowl on a mixing machine for a mixing operation is provided. The method includes locating the bowl at a bowl receiving assembly positioned below a mixer head of the mixing machine. The bowl receiving assembly includes a pair of bowl support arms extending outwardly from the mixer body to respective free ends located at opposite sides of the bowl. Each bowl support arm includes a mount protrusion extending upwardly therefrom. The mount protrusions include a notch located at the bases of the mount protrusions. The bowl receiving assembly is mounted for movement between a lowered position away from the head and a raised position toward the head. The mount protrusion of one of the bowl support arms is inserted within an enlarged portion of a keyway extending through a first mount support of the bowl. The mount protrusion of the other of the bowl support arms inserted within an enlarged portion of a keyway extending through a second mount support of the bowl. The bowl is rotated in a securing direction to slide the notches of the mount protrusions along necked-down portions of the keyways to mount the bowl on the bowl support arms.

In another aspect, a bowl for use with a mixing machine includes a first mount support having a first keyway extending therethrough. The first keyway has an enlarged portion sized and arranged to receive a mount protrusion of a first support arm of the mixing machine and a necked-down portion sized and arranged to slide within a notch of the respective mount protrusion. A second mount support has a second keyway extending therethrough. The second keyway has an enlarged portion sized and arranged to receive a mount protrusion of a second support arm and a necked-down portion sized and arranged to slide within a notch of the respective mount protrusion.

The details of one or more embodiments are set forth in the accompanying drawings and the description below. Other features, objects, and advantages will be apparent from the description and drawings, and from the claims.

DETAILED DESCRIPTION

Figure 1:
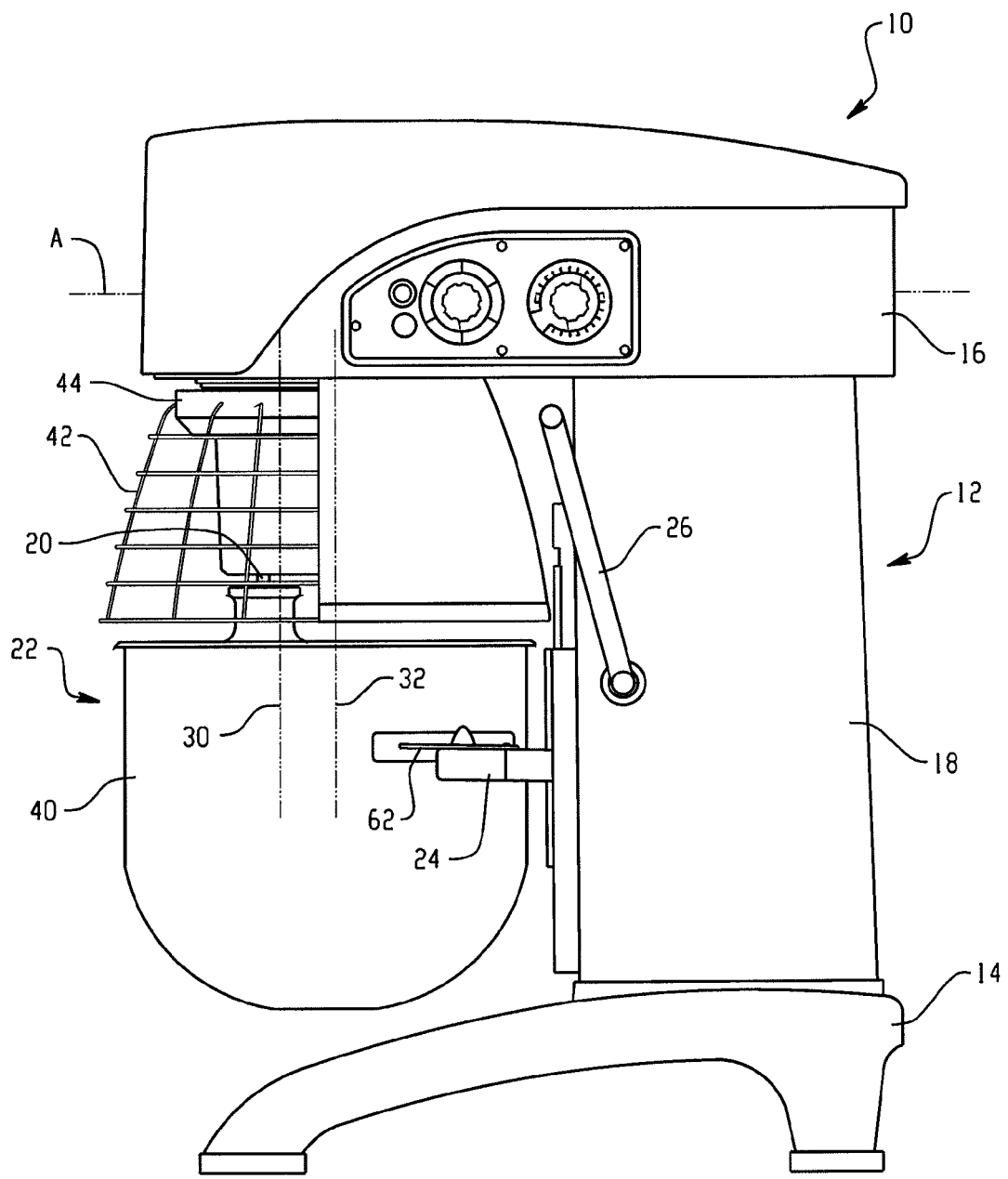
FIG. 1 is a side view of an embodiment of a mixing machine.

Referring to FIG. 1, a mixing machine 10 includes a mixer body 12 having a base portion 14, a head portion 16 and a support portion 18 (e.g., in the form of a column) connecting the head portion and the base portion in a vertically spaced-apart relationship. A front-to-back head portion axis A is shown. An output member 20 (e.g., a shaft for receiving a mixer tool such as a beater or whip) extends downward from the head portion 16 in a direction toward a bowl receiving location 22 formed between arms 24 of a bowl receiving yoke that can be moved up and down relative to the head portion 16 by rotation of a handle 26. A motor is located within the head portion 16 and may be mechanically linked to the output member 20, as by a gear system, for effecting rotation of the output member about a first axis 30 and rotation of the first axis 30 about a second axis 32 (e.g., a planetary movement or rotation).

Although not shown in FIG. 1, in some embodiments, the mixing machine 10 includes a power take off that extends outwardly from a front side of the head portion 16 and may take the form of a protruding hub or boss that is adapted for connection with mixer accessories such as meat grinders, slicers, etc. Internal of the power take off may be a drive member that is rotated by the motor that also rotates the output member 20 via the gear system.

An exemplary mix position of a bowl 40 is shown by FIG. 1 along with an exemplary position of a bowl guard assembly 42. A bowl guard support 44 is located at an underside of the head portion 16 and supports at least part of the bowl guard assembly 42 in a manner that enables the bowl guard assembly to be moved between a bowl guarding position and a bowl access position.

Figure 2:
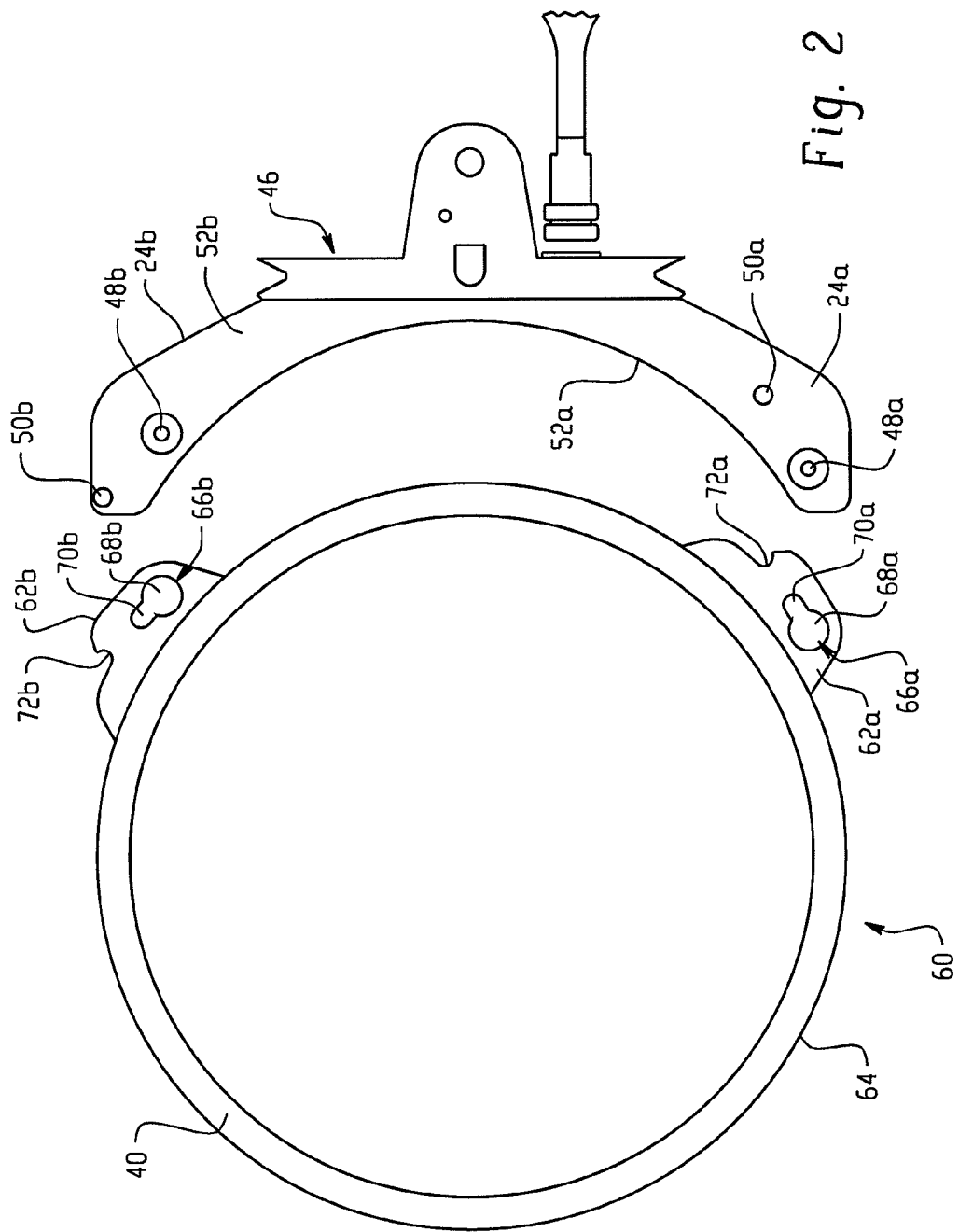
FIG. 2 is a top view of an embodiment of a bowl and arm support assembly for the mixing machine of FIG. 1.

FIG. 2 illustrates the bowl 40 and an arm assembly 46 in isolation. The arm assembly 46 includes the arms 24a and 24b that are used to support the bowl 40. Each arm 24a and 24b includes a mount protrusion 48a and 48b and a bowl guide pin 50a and 50b that are located alongside their respective mount protrusion. The mount protrusions 48a, 48b and bowl guide pins 50a, 50b extend upwardly from an upper surface 52a, 52b of their respective mount arms 24a, 24b.

Figure 3:
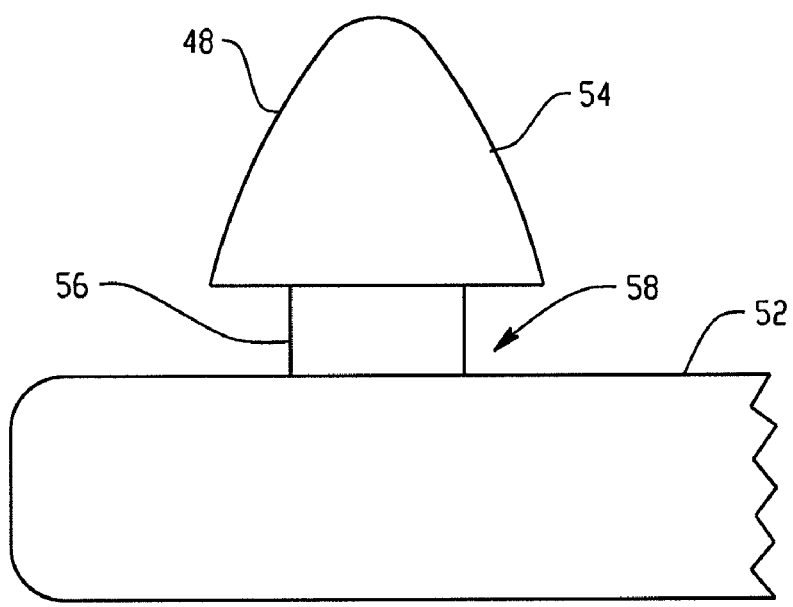
FIG. 3 is a partial, side view of an arm of the arm support assembly of FIG. 2.

FIG. 3 shows a side, detail view of one of the mount protrusions 48 extending upwardly from surface 52. The mount protrusions 48 include a tapered head portion 54 and a stem portion 56 that is narrower than the head portion to form a notch 58 between the head portion and the surface 52. The head portion 54 may be other shapes, however, in the illustrated embodiment, the head portion is in the shape of a truncated cone.

Referring back to FIG. 2, the bowl 40 includes a bowl-shaped body 60 and a pair of bowl mount supports 62a and 62b extending outwardly from an exterior surface 64 of the bowl-shaped body. Each bowl mount support 62a, 62b includes a keyway 66a, 66b including an enlarged portion 68a, 68b and a necked-down or narrower portion 70a, 70b. Extending inwardly from a periphery of each bowl mount support 62a, 62b is a guide pin receiving notch 72a, 72b.

Figure 4:
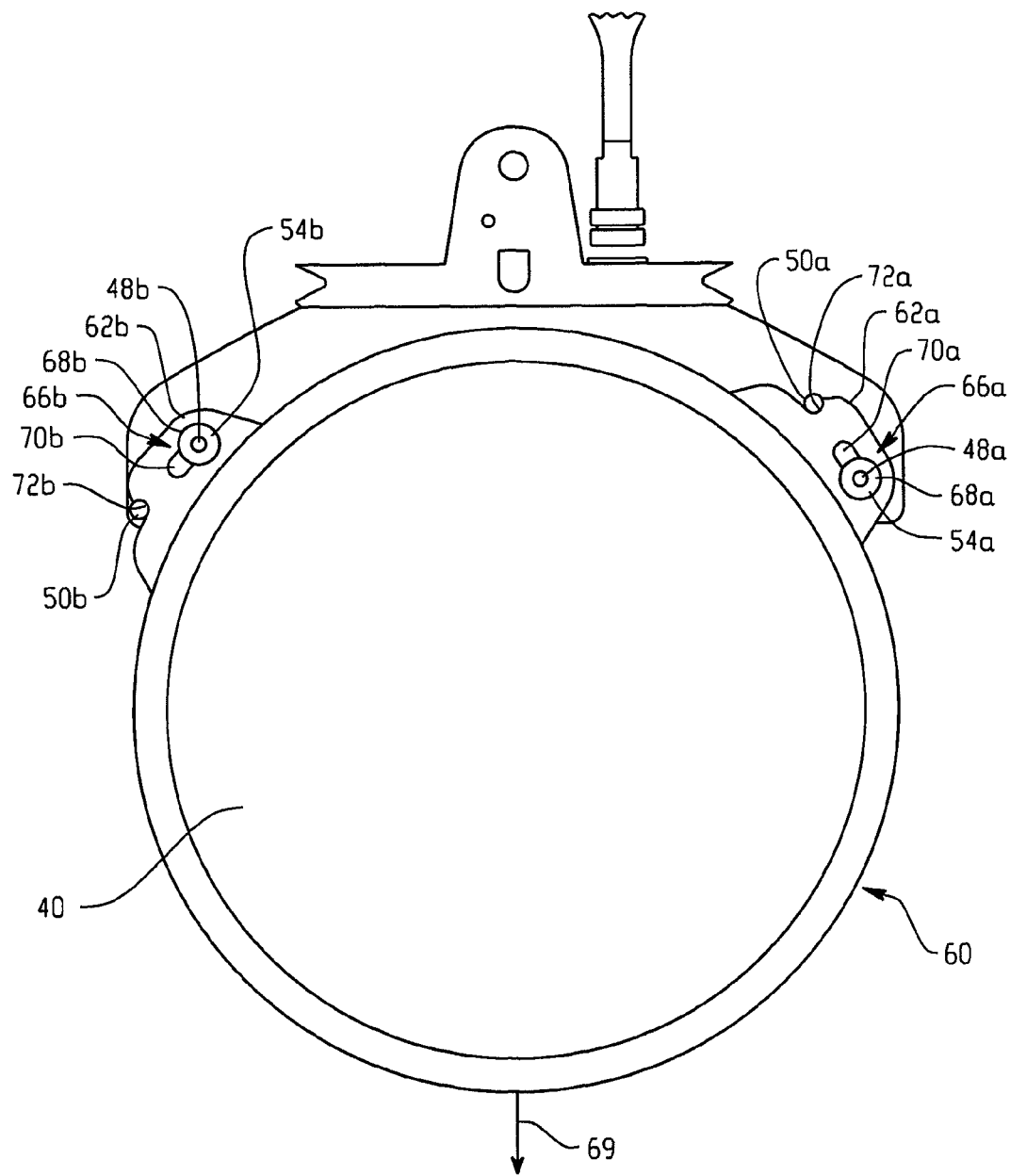
FIG. 4 is a top view of the bowl and arm support assembly of FIG. 2 with the bowl in an initial mount position.

Referring to FIG. 4, the bowl 40 is illustrated in an initial bowl connect position. As can be seen, the enlarged portions 68a, 68b of the keyways 66a, 66b are sized and arranged to simultaneously receive the mount protrusions 48a, 48b such that their enlarged head portions 54a, 54b extend upwardly through the keyways and beyond the bowl mount supports 62a, 62b. The bowl guide pins 50a and 50b are engaged by the bowl mount supports 62a and 62b within the pin receiving notches 72a and 72b. The bowl guide pins 50a, 50b are used to stabilize the bowl 40 and allow controlled forward tilting of the bowl with the protrusions 48a, 48b located at the enlarged portions of their respective keyways 66a, 66b. Without the bowl guide pins 50a and 50b, the bowl 40 would tend to tilt forward (in the direction of arrow 69) an undesired amount due to the size of the enlarged portions 68a, 68b, notches 58 and position of the protrusions 48a, 48b, arms 24a, 24b and bowl mount supports 62a, 62b rearward on the bowl-shaped body 60. Some forward tilting of the bowl 40 can be desirable, for example, to expose more of the bowl's interior to the operator. Forward tilting of the bowl 40 an undesired amount can require forward and rearward maneuvering to lift the bowl from the arms 24a, 24b. As can be seen, the arms 24a and 24b together extend about the bowl-shaped body 60 a distance less than 180 degrees (e.g., about 120 degrees). In other embodiments, however, the arms may extend about the bowl-shaped body 60 to a greater or lesser degree than illustrated.

Figure 5:
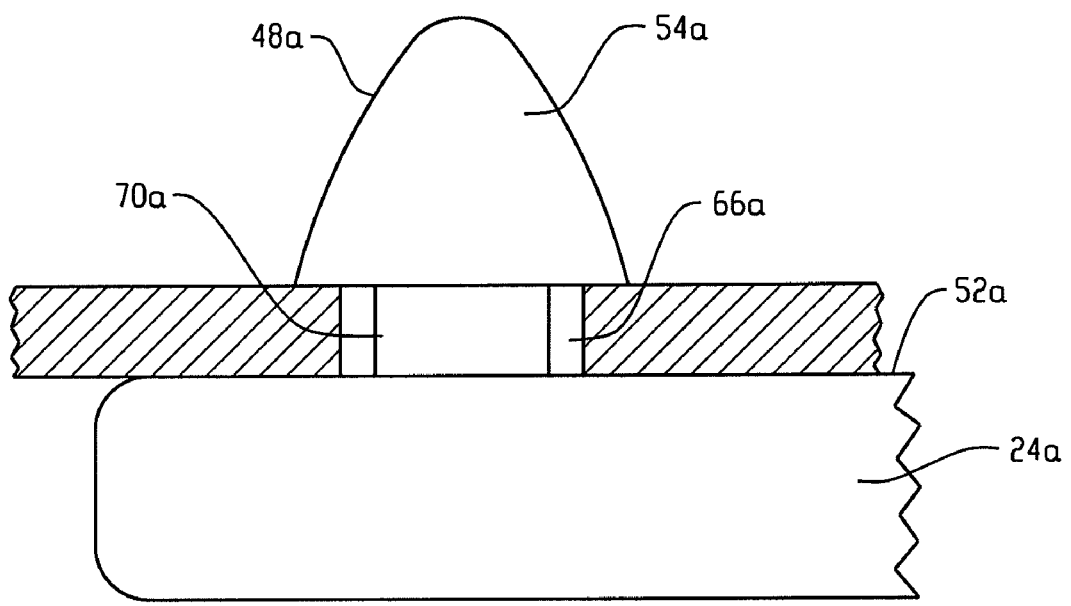
FIG. 5 is a detail, section view of a bowl mount support mounted to the arm support assembly of FIG. 4.

In order to secure the bowl 40 in place on the mount arms 24, the bowl is rotated, in this instance, in a clockwise direction (a securing direction) which locates the necked-down portions 70a and 70b within the notches 58 as shown by FIG. 5. Locating the necked-down portions 70a, 70b in the notches 58 places edges of the keyways 66a, 66b underneath the head portions 54 of the mount protrusions 48 thereby capturing the bowl mount supports 62a, 62b between the enlarged head portions 54 and the surface 52 of the arms 24a, 24b.

In some instances, the bowl 40 may be turned manually to secure the bowl in place on the mount arms 24. In other instances, the mixing action of the mixer tool and its planetary motion provides sufficient turning force to turn the bowl in its securing direction (e.g., clockwise) to lock the bowl in place as shown by FIG. 5 without any manual application of turning force. In some embodiments, an automated bowl turning device may be provided for turning the bowl in its securing direction.

To release the bowl 40, the bowl is rotated in a counter-clockwise direction (an unsecuring direction), which locates the mount protrusions 48 at the enlarged portions 68a, 68b of the keyways 66a, 66b. In addition to controlling the amount of forward tilt of the bowl 40, the bowl guide pins 50a, 50b serve as stops to prevent over rotation of the bowl and to align the enlarged head portions 54 of the mount protrusions 48 with the enlarged portions 68a, 68b of the keyways 66a, 66b such that the bowl can be lifted vertically from the arms 24a, 24b with the head portions passing through the enlarged portions of the keyways. Use of the bowl guide pins 50a, 50b can reduce the need for an operator to reposition the bowl 40 to align the enlarged portion 68a, 68b of the keyways 66a, 66b with the enlarged head portions 54 in the event of over rotation of the bowl so that the bowl can be removed.

Figure 6:
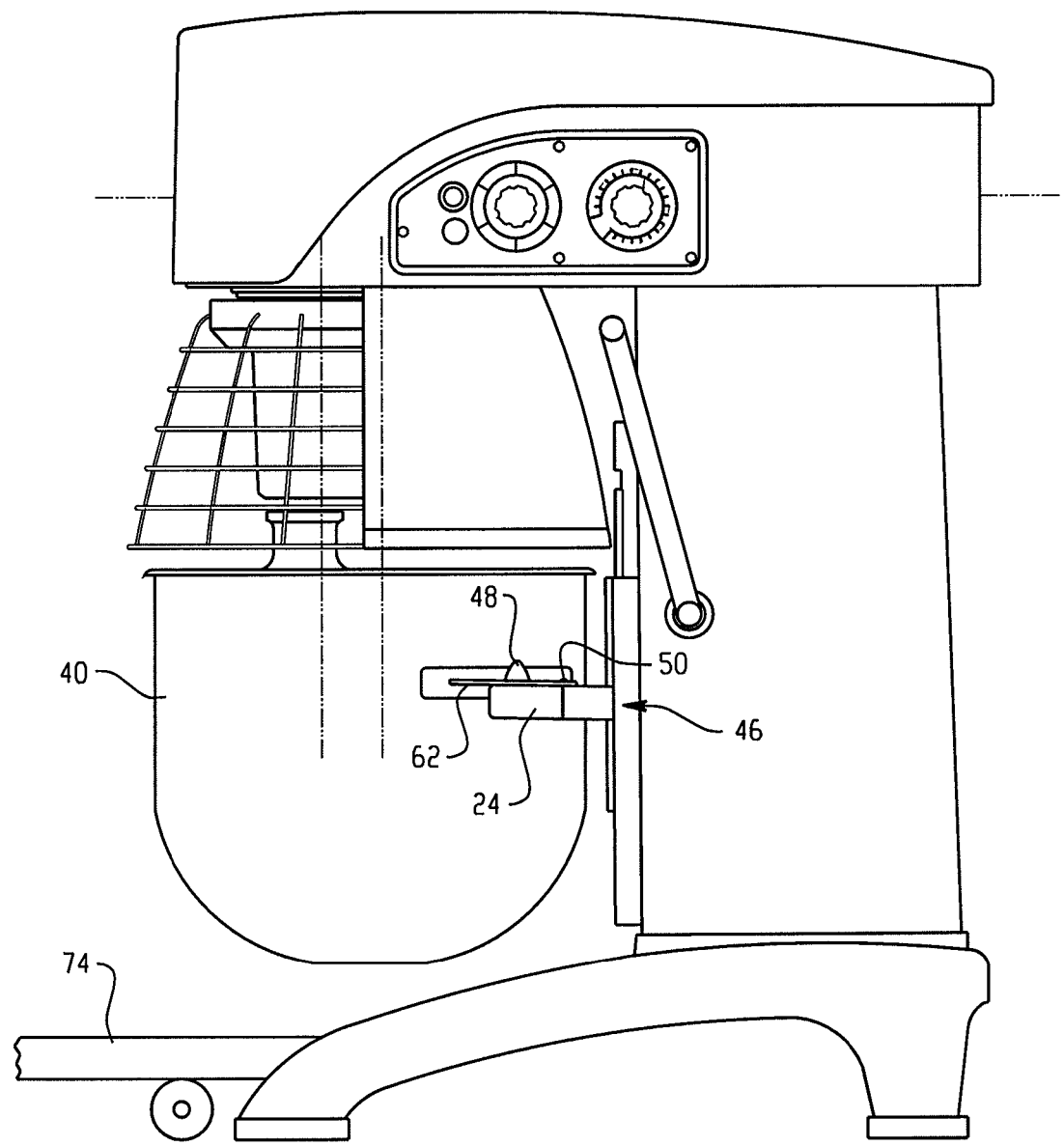
FIG. 6 is another embodiment of a mixing machine with a hand truck positioned beneath the bowl.

FIG. 6 illustrates another advantage of the above-described bowl attachment system, particularly in relatively heavy duty applications (e.g., 60 to 140 quarts). As mentioned above, the arm assembly 46 can be moved up and down to lift and lower the bowl 40 between mixing and access positions. In heavy duty applications, the lifting and lowering of the bowl 40 and arm assembly 46 may be accomplished via a powered, mechanical system, as opposed to the handle described above.

In some embodiments after a mixing operation, the bowl 40 may be rotated in the unsecuring direction as described above to align the enlarged portions 68 of the keyways 66 with the mount protrusions 48. In this position, the bowl guide pins 50 are engaged by the bowl mount supports 62 within the pin receiving notches 72. The bowl guide pins 50 serve to align the mount protrusions 48 with the enlarged portions 68 of the keyways 66 and control forward tilting of the bowl 40. A hand truck 74 may be positioned beneath the bowl 40 prior to lowering the bowl. As the bowl 40 is lowered by the power lifting system, the bowl engages the hand truck 74 and is lifted from the mount arms 24 with the mount protrusions 48 passing through the enlarged portions 68 of the keyways 66. This lifting of the bowl 40 from the mount arms 24 can be accomplished without any need for additional positioning of the bowl once the bowl is rotated to its unsecuring position with the bowl guide pins 50 engaged within the pin receiving notches 72 of the bowl mount supports 62.

Figure 7:
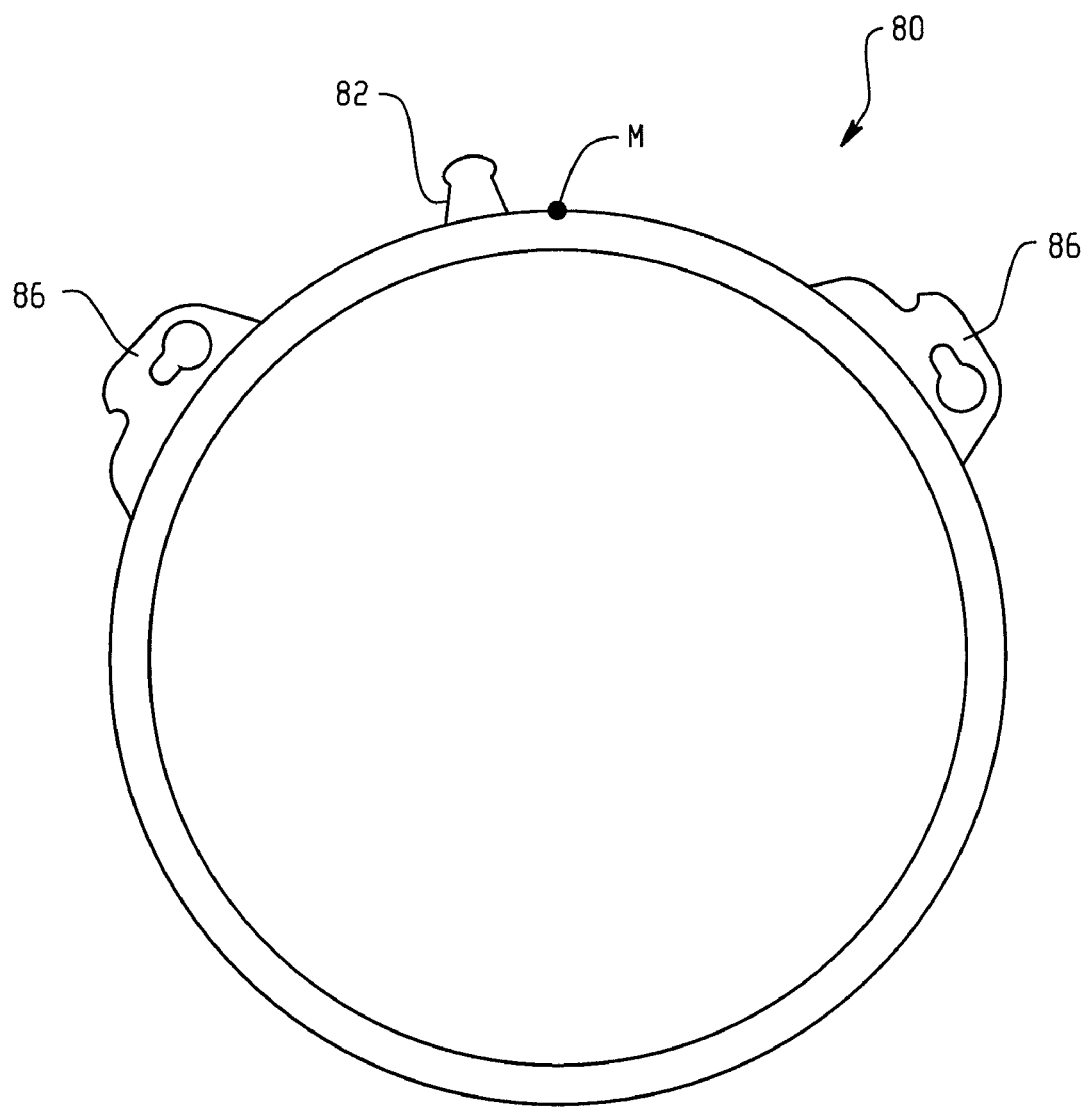
FIG. 7 is another embodiment of a bowl for use with a mixing machine.
Figure 8:
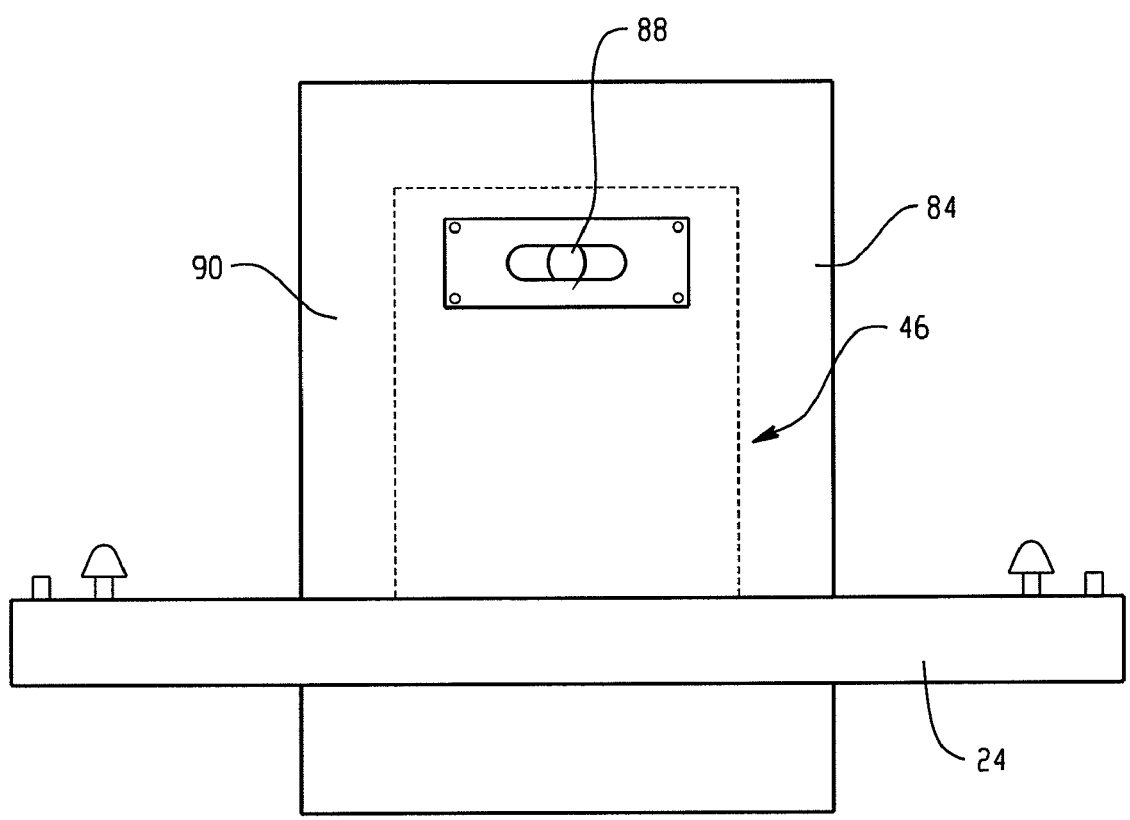
FIG. 8 is a partial front view of another embodiment of a mixing machine for use with the bowl of FIG. 7.

Referring now to FIG. 7, in some embodiments, such as in heavier duty applications (e.g., 20 quarts or higher), a bowl 80 includes a rear support member 82 that is used to provide additional support for the bowl when it is mounted on support arms 24 of a mixing machine 84 (see FIG. 8) in a fashion similar to that described above. The rear support member 82 is offset from a midpoint M on an arc spanning between bowl mount supports 86. Referring also to FIG. 8, this offset allows the rear support member 82 to be placed within a central mounting slot 88 provided on mixing body 90 of the mixing machine 84 when the bowl 80 is rotated as described above. In some embodiments, the central mounting slot 88 is connected to the arm assembly 46 and moves up and down therewith.

Figure 9:
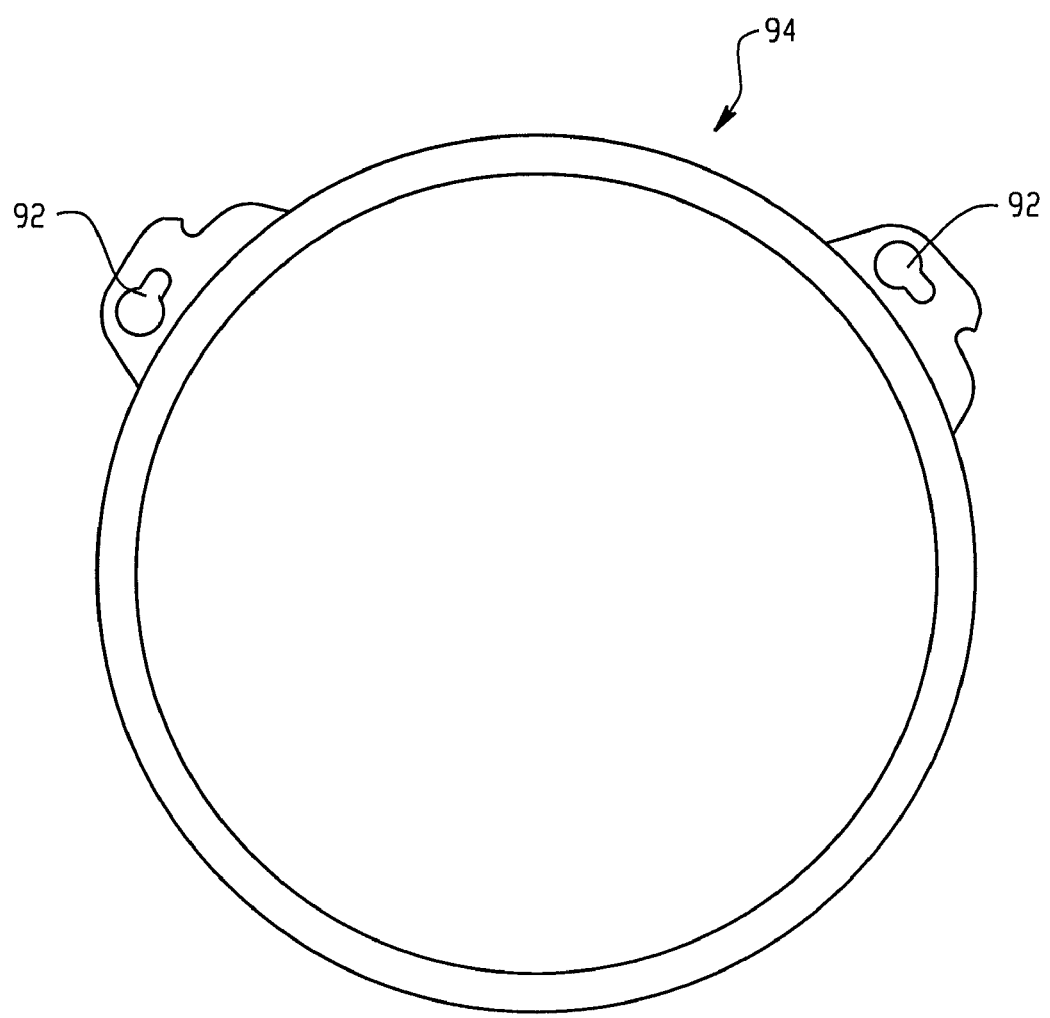
FIG. 9 is a top view of another embodiment of a bowl for use with a mixing machine.

It is to be clearly understood that the above description is intended by way of illustration and example only and is not intended to be taken by way of limitation, and that changes and modifications are possible. For example, referring to FIG. 9, the orientation of the keyways may be reversed so that counter-clockwise rotation of the bowl places the bowl in its securing position and clockwise rotation of the bowl aligns the mount protrusions with the enlarged portions of the keyways. Accordingly, other embodiments are contemplated and modifications and changes could be made without departing from the scope of this application.

What is claimed is:

1. A mixing machine, comprising:
a head including a rotatable output member for receiving a mixer tool;
a mixer body including a bowl receiving assembly below the head, the bowl receiving assembly comprising a pair of bowl support arms extending outwardly from the mixer body to respective ends located at opposite sides of a bowl receiving location, each bowl support arm including a mount protrusion extending upwardly therefrom, the mount protrusions including a notch located at bases of the mount protrusions, the bowl receiving assembly being mounted for movement between a lowered position away from the head and a raised position toward the head;

a bowl including a first mount support having a first keyway extending therethrough and a second mount support having a second keyway extending therethrough, the first keyway having an enlarged portion that receives the mount protrusion of one of the support arms and a necked-down portion that slides within the notch of the respective mount protrusion, the second keyway having an enlarged portion that receives the mount protrusion of the other of the support arms and a necked-down portion that slides within the notch of the respective mount protrusion; and the first and second keyways being sized and arranged such that the mount protrusions are received by the enlarged portions of the first and second keyways and rotation of the bowl places the necked-down portions of the first and second keyways within the respective notches of the mount protrusions to mount the bowl on the bowl support arms.

2. A mixing machine, comprising:

a head including a rotatable output member for receiving a mixer tool;

a mixer body including a bowl receiving assembly below the head, the bowl receiving assembly comprising a pair of bowl support arms extending outwardly from the mixer body to respective ends located at opposite sides of a bowl receiving location, each bowl support arm including a mount protrusion extending upwardly therefrom, the mount protrusions including a notch located at bases of the mount protrusions, the bowl receiving assembly being mounted for movement between a lowered position away from the head and a raised position toward the head;

wherein at least one bowl support arm includes a bowl guide pin extending upwardly therefrom and located adjacent the respective mount protrusion of the at least one bowl support arm.

3. The mixing machine of claim 2, wherein the other bowl support arm includes a bowl guide pin extending upwardly therefrom and located adjacent the respective mount protrusion of the other bowl support arm.

4. The mixing machine of claim 3 further comprising a bowl including a first mount support having a first keyway extending therethrough and a second mount support having a second keyway extending therethrough, the first keyway having an enlarged portion that receives the mount protrusion of one of the support arms and a necked-down portion that slides within the notch of the respective mount protrusion, the second keyway having an enlarged portion that receives the mount protrusion of the other of the support arms and a necked-down portion that slides within the notch of the respective mount protrusion;

the first and second keyways being sized and arranged such that the mount protrusions are received by the enlarged portions of the first and second keyways and rotation of the bowl places the necked-down portions of the first and second keyways within the respective notches of the mount protrusions to mount the bowl on the bowl support arms;

wherein the first and second mount supports include a guide pin receiving notch, each guide pin receiving notch receiving the guide pin of the respective bowl support arm when the respective mount protrusion is located at the enlarged portion of the respective first and second keyway.

5. The mixing machine of claim 4, wherein the bowl guide pins interact with the mount supports to inhibit tilting of the bowl when the mount protrusions are located at the enlarged portions of their respective first and second keyways.

6. The mixing machine of claim 4, wherein the bowl support arms together extend about a periphery of the bowl less than 180 degrees.

7. A method of mounting a bowl on a mixing machine for a mixing operation, the method comprising:

locating the bowl at a bowl receiving assembly positioned below a mixer head of the mixing machine, the bowl receiving assembly comprising a pair of bowl support arms extending outwardly from the mixer body to respective free ends located at opposite sides of the bowl, each bowl support arm including a mount protrusion extending upwardly therefrom, the mount protrusions including a notch located at the bases of the mount protrusions, the bowl receiving assembly being mounted for movement between a lowered position away from the head and a raised position toward the head;

inserting the mount protrusion of one of the bowl support arms within an enlarged portion of a keyway extending through a first mount support of the bowl;

inserting the mount protrusion of the other of the bowl support arms within an enlarged portion of a keyway extending through a second mount support of the bowl; and rotating the bowl in a securing direction to slide the notches of the mount protrusions along necked-down portions of the keyways to mount the bowl on the bowl support arms.

8. The method of claim 7 further comprising engaging a bowl guide pin located adjacent the mount protrusion within a guide pin receiving notch of at least one of the first and second mount supports, the guide pin receiving notch receiving the guide pin of the respective bowl support arm when the respective mount protrusion is located at the enlarged portion of the respective keyway.

9. The method of claim 8 further comprising rotating the bowl in an unsecuring direction to locate the mount protrusions at the enlarged portions of the keyways.

10. The method of claim 7, wherein the step of rotating the bowl is performed manually by an operator.

11. The method of claim 7, wherein the step of rotating is performed automatically by mixing action.

12. A bowl for use with a mixing machine, the bowl comprising:

a first mount support having a first keyway extending therethrough, the first keyway having an enlarged portion sized and arranged to receive a mount protrusion of a first support arm of the mixing machine and a necked-down portion sized and arranged to slide within a notch of the respective mount protrusion; and a second mount support having a second keyway extending therethrough, the second keyway having an enlarged portion sized and arranged to receive a mount protrusion of a second support arm and a necked-down portion sized and arranged to slide within a notch of the respective mount protrusion.

13. The bowl of claim 12, wherein the first and second keyways are sized and configured such that the mount protrusions are received by the enlarged portions of the first and second keyways and rotation of the bowl places the necked-down portions of the first and second keyways within the respective notches of the mount protrusions to mount the bowl on the bowl support arms.

14. The bowl of claim 12, wherein the first and second mount supports include a guide pin receiving notch, each guide pin receiving notch arranged and configured to receive a guide pin of the respective bowl support arm when the respective mount protrusion is located at the enlarged portion of the respective first and second keyway.

15. The bowl of claim 12, wherein the first and second keyways are located less than 180 degrees apart from each other about the bowl's periphery.

* * * * *